United States Patent [19]

Spirk

[11] Patent Number: 4,672,252
[45] Date of Patent: Jun. 9, 1987

[54] ELECTRICAL MACHINE WITH A STATOR LAMINATION OF GRAIN-ORIENTED SHEETS

[75] Inventor: Franz Spirk, Berlin, Fed. Rep. of Germany

[73] Assignee: Siemens Aktiengesellschaft, Berlin and Munich, Fed. Rep. of Germany

[21] Appl. No.: 234,575

[22] Filed: Feb. 13, 1981

[30] Foreign Application Priority Data

Feb. 15, 1980 [DE] Fed. Rep. of Germany ....... 3006207

[51] Int. Cl.⁴ .............................................. H02K 1/16
[52] U.S. Cl. .................................................. 310/216
[58] Field of Search ................. 29/596, 609; 310/216, 310/217, 218, 256, 258, 259

[56] References Cited

U.S. PATENT DOCUMENTS

| | | | |
|---|---|---|---|
| 2,046,717 | 7/1936 | Bitter | 310/259 |
| 2,433,660 | 12/1947 | Granfield | 310/216 |
| 2,774,000 | 12/1956 | Ross | 310/259 |
| 2,792,511 | 5/1957 | Horstman | 310/216 |
| 2,968,860 | 1/1961 | Mereness | 310/216 |
| 3,809,938 | 5/1974 | Sjoberg et al. | 310/254 |

Primary Examiner—Patrick R. Salce
Assistant Examiner—D. L. Rebsch
Attorney, Agent, or Firm—Kenyon & Kenyon

[57] ABSTRACT

The laminations of a laminated stator of a slowly running electrical machine having a high number of poles are composed of grain-oriented sheets, each of which has a preferential magnetic direction that extends substantially longitudinally along the teeth of that sheet. This permits the excitation current to be reduced, and, as a result, the air gap of the machine can be enlarged so that, on the whole, approximately the same excitation is required as for a laminated stator in which the laminations consist of normal, non-oriented sheets. As a result, the mechanical stability of the machine is increased. The invention is especially useful in asynchronous tube generators.

2 Claims, 1 Drawing Figure

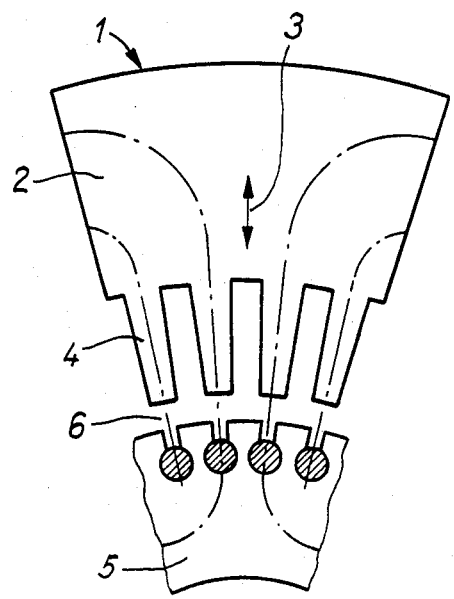

ELECTRICAL MACHINE WITH A STATOR LAMINATION OF GRAIN-ORIENTED SHEETS

BACKGROUND OF THE INVENTION

This invention relates to an electrical machine with a laminated stator in which the laminations consist of grain-oriented sheets with a preferred magnetic direction extending in the longitudinal direction of the teeth.

A machine having grain-oriented stator laminations is described in German patent application No. DE-AS14 63 978. According to the description therein, the stator laminations of a turbo generator are grain-oriented and are divided into yoke and tooth portions. The preferred magnetic direction in the yoke portion extends in the circumferential direction, according to the respective direction of flux, and in the longitudinal direction of the teeth in the tooth portion. By arranging the laminations that way, it is intended to reduce the excitation current requirement of the machine. However, sheets composed of a yoke portion and a tooth portion arranged in that manner require either that the joint between the two portions be welded or that special measures be taken for joining or latching the two sheet portions together so as not to jeopardize the transmission of torque.

OBJECTS AND SUMMARY OF THE INVENTION

It is an object of the invention to improve the mechanical stability of the stator and of the rotor in a slowly running electrical machine that has a high number of poles and a large bore diameter, as is required for generators of the type used in bulb turbine sets.

According to this invention, in a slowly running electrical machine that has a high number of poles of the above described type, the sheets of the stator laminations have as a whole, the preferential grain direction only in the longitudinal direction of the teeth, which reduces the excitation current requirement. As a result, the air gap between the stator and rotor is enlarged so that, on the whole, approximately the same excitation current is required as for a stator lamination of normal sheets. The stator lamination, therefore, is composed of uniform sheets that are grain-oriented with the preferential direction extending substantially in the longitudinal direction of the teeth. Since a large part of the cost of excitation is required for the magnetization of the stator teeth, the excitation current requirement for such a stator is reduced as compared with a stator in which the laminations consist of normal, nonoriented sheets. The enlargement of the air gap of the machine has the advantage that the mechanical stability of the stator and rotor due to dead weight, the pressure of the driving water, and the magnetic pull are improved without requiring that any expensive mechanical measures be taken. Another advantage is that the losses in the tooth zone are reduced, and, accordingly, the axial length of the machine can be reduced as compared with the length that would otherwise be required.

This arrangement is particularly advantageous in a generator of a bulb turbine set based on an asynchronous design. Such machines have a substantially smaller air gap than machines of synchronous design, which makes it possible to achieve an increase in the mechanical stability of the entire machine for equal cos0 by means of the greater air gap.

An example of construction of the machine is illustrated schematically in the drawing, which consists of only one FIGURE an asynchronous machine designed according to the invention.

DETAILED DESCRIPTION OF THE INVENTION

A turbine set generator designed as an asynchronous machine has stator laminations such as the lamination 1 divided into sheets 2 formed of grain-oriented material in which the preferential direction is indicated by an arrow 3 that extends substantially in the longitudinal direction of the teeth 4 of that sheet. The sheets of the lamination 5 of the rotor of that machine are of normal dynamo sheet material. Because of the reduction of the excitation current requirement resulting from the use of grain-oriented sheets, the air gap 6 is greater than in an asynchronous machine using non-oriented stator sheets and having the same dimensions and the same excitation current requirements. This larger air gap 6 has the advantage that the mechanical stability of the machine is substantially improved relative to machines having a smaller air gap. This is essential, especially in asynchronous machines having a bore diameter of six to nine meters used in bulb generators for power outputs over 40 MVA, as such machines are subject to a high load caused by the dead weight, the pressure of the surrounding driving water, and the magnetic pull.

The dot-dash lines show magnetic flux paths in the sheet 2. As may be seen, the limited angular extent of the sheet causes most of each flux path, except at the outer perimeter of the sheet and, even there, mostly near the radial edges, to be parallel or almost parallel to the preferential magnetic direction 3.

What is claimed is:

1. In an electric machine having a stator lamination made up of grain-oriented sheets, each having a plurality of radially directed teeth, the radial direction of the teeth establishing a lengthwise direction, the direction of the grain orientation, in the area of the teeth, extending in the lengthwise direction of the teeth, said machine having a large number of poles, and adapted to run at a slow speed, the improvement comprising, the sheets making up the stator lamination having as their direction of grain orientation, throughout the sheet, a direction essentially corresponding to the lengthwise direction of the teeth and, the air gap in said machine enlarged to the extent that the excitation current requirements for the machine correspond to that of a stator lamination made up of normal, non-oriented sheets, thereby permitting increased mechanical stability in the machine.

2. The improvement according to claim 1, wherein said electric machine comprises slowly running asynchronous generator forming a part of a bulb turbine set.

* * * * *